United States Patent
Shore

(10) Patent No.: US 11,630,749 B2
(45) Date of Patent: Apr. 18, 2023

(54) ELECTRONIC SYSTEM FOR APPLICATION MONITORING AND PREEMPTIVE REMEDIATION OF ASSOCIATED EVENTS

(71) Applicant: BANK OF AMERICA CORPORATION, Charlotte, NC (US)

(72) Inventor: Elisabeth Loeber Shore, McKinney, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 161 days.

(21) Appl. No.: 17/226,234

(22) Filed: Apr. 9, 2021

(65) Prior Publication Data
US 2022/0327038 A1   Oct. 13, 2022

(51) Int. Cl.
| | |
|---|---|
| G06F 11/00 | (2006.01) |
| G06F 11/30 | (2006.01) |
| G06F 11/07 | (2006.01) |
| G06F 11/36 | (2006.01) |

(52) U.S. Cl.
CPC ........ *G06F 11/302* (2013.01); *G06F 11/0793* (2013.01); *G06F 11/3688* (2013.01)

(58) Field of Classification Search
CPC . G06F 11/0793; G06F 11/302; G06F 11/3688
See application file for complete search history.

(56) References Cited

U.S. PATENT DOCUMENTS

| | | | |
|---|---|---|---|
| 6,237,114 B1* | 5/2001 | Wookey | G06F 11/3055 714/57 |
| 8,230,267 B2 | 7/2012 | Noller et al. | |
| 8,850,398 B1* | 9/2014 | L'Heureux | H04L 67/10 717/124 |
| 9,032,259 B1 | 5/2015 | Hood | |
| 9,032,360 B1 | 5/2015 | Cohen et al. | |
| 9,262,404 B2 | 2/2016 | Ingram et al. | |
| 9,495,642 B1 | 11/2016 | Smith et al. | |
| 10,578,673 B2 | 3/2020 | Ranganathan et al. | |
| 10,748,068 B2 | 8/2020 | Smith et al. | |
| 10,891,218 B2 | 1/2021 | Champlin-Scharff et al. | |
| 11,163,674 B1* | 11/2021 | Campos Perez | G06F 11/3684 |
| 11,249,888 B1* | 2/2022 | Campos Perez | G06F 11/3684 |

(Continued)

*Primary Examiner* — Joshua P Lottich
(74) *Attorney, Agent, or Firm* — Moore & Van Allen PLLC; Gabrielle M. Carlini

(57) ABSTRACT

Embodiments of the invention relate to an application monitoring and unplanned event remediation system, which analyzes event data to generate dynamic testing strategies and then apply said testing strategies in real-time to predict future events. The invention utilizes past event data to prioritize testing of particular application conditions, allowing for continuous monitoring without creating unnecessary strain on available computing resources. Because a variety of application operating states can result in unplanned events, the present invention provides the functional benefit of adapting testing strategies in real-time as an application's operating state changes, increasing the likelihood of correctly predicting a future event. The present invention also provides a system of alerting a managing entity system to a future event, as well as providing instructions for preventative or remedial actions which may serve to lessen the potential impact of an unplanned event on a managing entity.

13 Claims, 4 Drawing Sheets

(56) References Cited

U.S. PATENT DOCUMENTS

| | | |
|---|---|---|
| 2003/0204836 A1 | 10/2003 | Srivastava et al. |
| 2005/0257086 A1 | 11/2005 | Triou et al. |
| 2007/0168734 A1 | 7/2007 | Vasile |
| 2007/0234293 A1 | 10/2007 | Noller et al. |
| 2009/0265681 A1 | 10/2009 | Beto et al. |
| 2012/0159443 A1 | 6/2012 | Kamenz et al. |
| 2012/0266023 A1 | 10/2012 | Brown et al. |
| 2013/0074051 A1 | 3/2013 | Freeman |
| 2015/0082277 A1 | 3/2015 | Champlin-Scharff et al. |
| 2016/0117239 A1 | 4/2016 | Hamilton, II et al. |
| 2017/0249234 A1* | 8/2017 | Kalech ................ G06F 11/0793 |
| 2019/0065357 A1 | 2/2019 | Brafman et al. |
| 2020/0192787 A1* | 6/2020 | Cauley ..................... G06F 8/60 |
| 2021/0056009 A1* | 2/2021 | Gal ..................... G06F 11/3664 |

\* cited by examiner

ELECTRONIC SYSTEM FOR APPLICATION MONITORING AND PREEMPTIVE REMEDIATION OF ASSOCIATED EVENTS

BACKGROUND

An organization or entity may be responsible for maintaining a number of systemwide applications, many of which may be used for performing critical tasks. Because these applications are susceptible to unplanned events such as outages, security breaches, or data losses, an entity may utilize a variety of information technology practices in order to mitigate the issues caused by such unplanned events. As part of an overall strategy for managing unplanned application events, there is a need for a system which is able to proactively monitor systemwide applications in order to predict future events.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems, methods, and computer program products for application monitoring, the invention including: monitoring event data via continuous communication with a managing entity system, where the event data includes a plurality of variables and associated values; applying a plurality of event type testing sequences to the event data, where each event type testing sequence includes a plurality of tests, where each test includes failure criteria, and where applying each testing sequence further includes: applying one of the plurality of tests to the event data and when the event data does not meet the failure criteria, continuing to monitor the event data via continuous communication with the managing entity, or when the event data meets the failure criteria, applying a different one of the plurality of tests to the event data; and transmitting, when the event data meets the failure criteria for each of the plurality of tests in the event type testing sequence, a notification to the managing entity system.

In some embodiments, the invention further includes: receiving an event data transmission from the managing entity system, wherein the event data transmission includes an event type, the plurality of variables and associated values, and a plurality of time values; identifying, from the event data transmission, a new event dataset, where the new event dataset includes an event type and a value of each variable for each time value; querying, from a database, one or more past event datasets, where the event type of each past dataset matches the event type of the new event dataset; calculating, for each variable of each event dataset, a likelihood score of each value occurring at each time value; and calculating, using a combination of likelihood scores, one or more event type testing sequences.

In some embodiments, calculating, using a combination of likelihood scores, one or more event type testing sequences further includes calculating a plurality of potential event type testing sequences.

In some embodiments, the invention further includes, after calculating a plurality of potential event type testing sequences, determining one or more preferred event type testing sequences from the plurality of potential event type testing sequences, based on one or more decision factors.

In some embodiments, applying a plurality of event type testing sequences to the event data further includes applying each of the one or more preferred event type testing sequences to the event data.

In some embodiments, the invention further includes, after calculating the one or more event type testing sequences, storing the new event dataset in the database.

In some embodiments, the notification to the managing entity system includes an indication of a potential future event and instructions for a preventative action which can be executed by the managing entity system.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
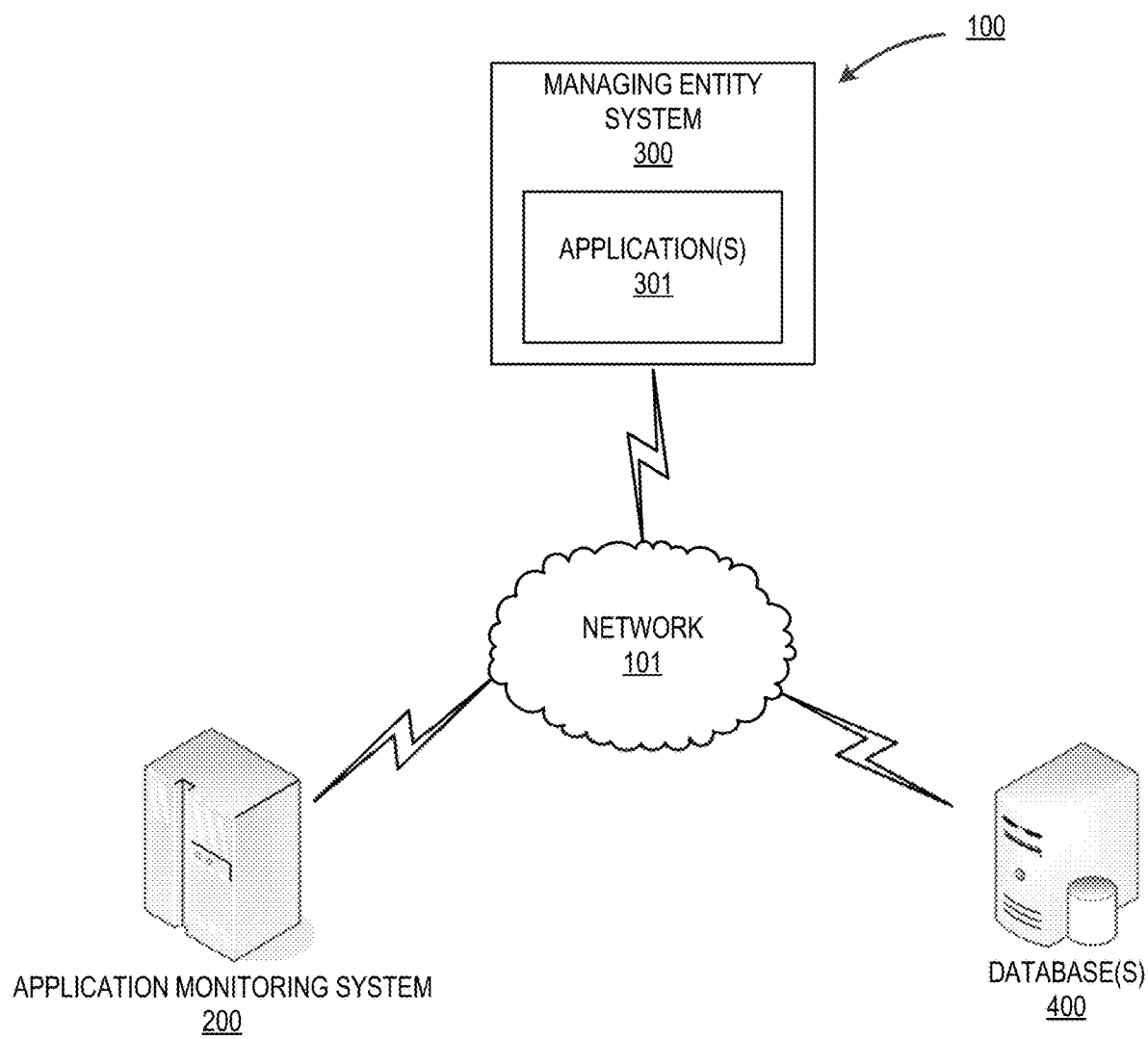
Figure 2:
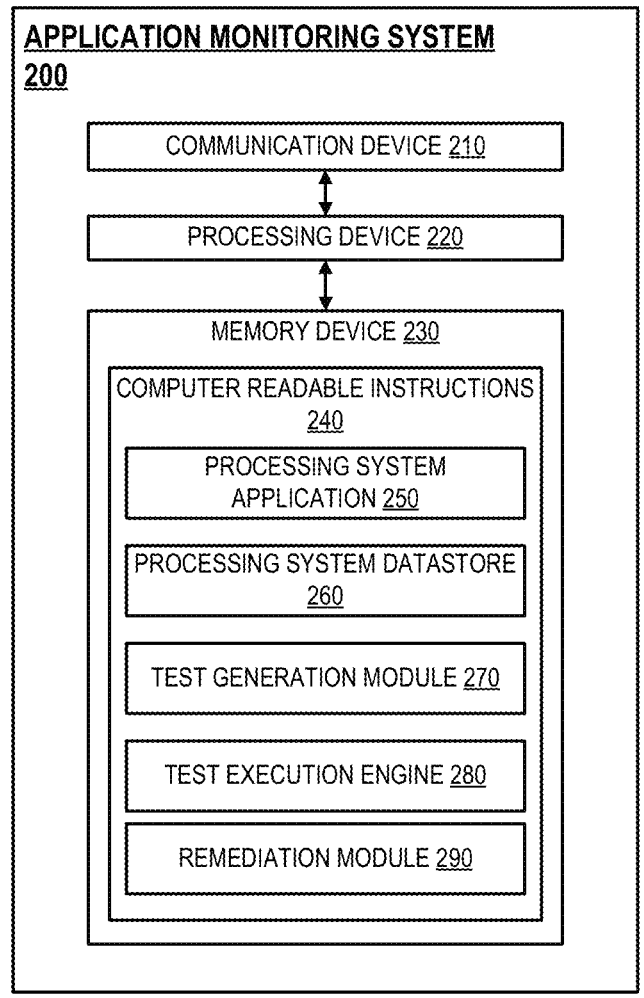
Figure 3:
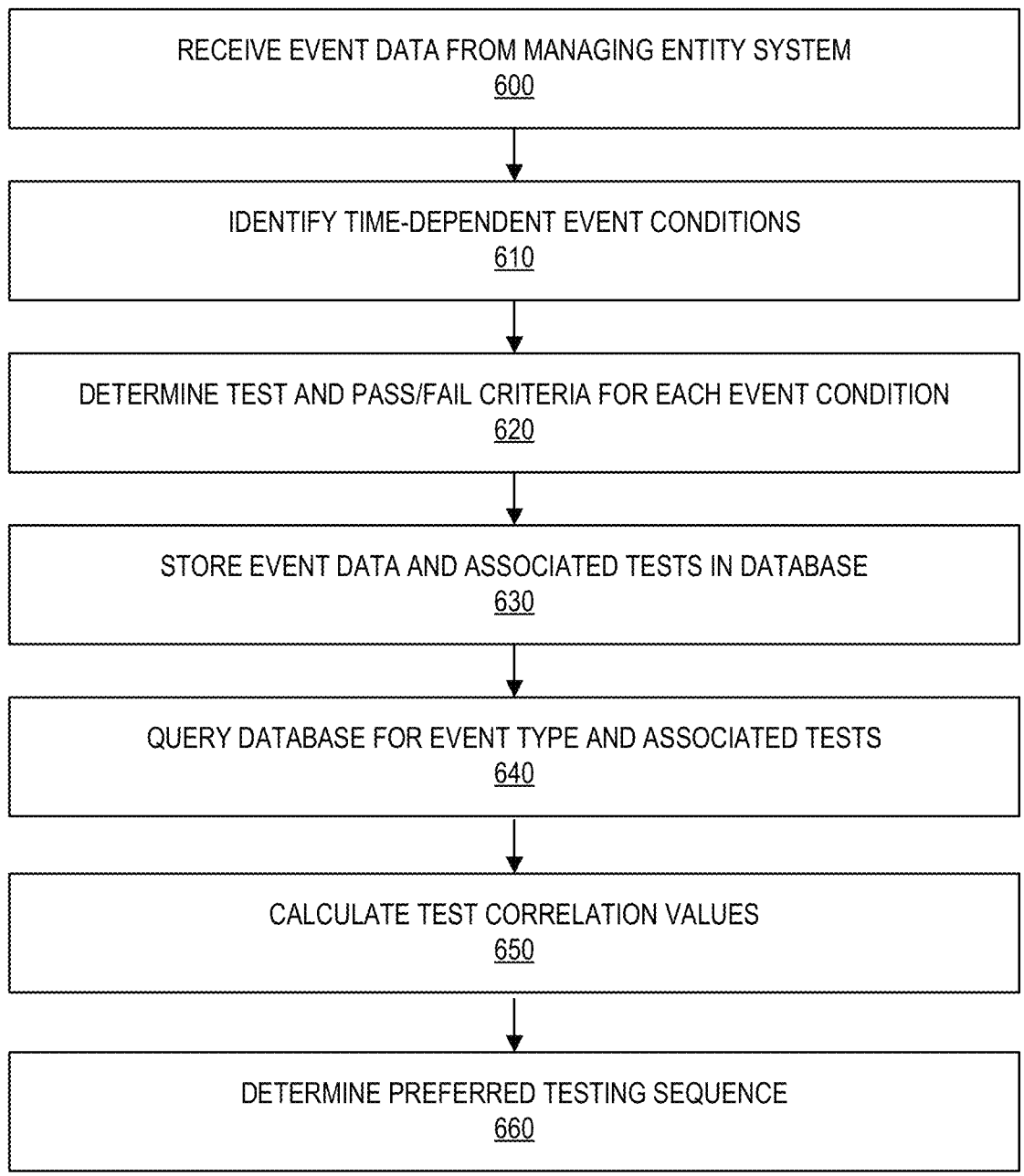
Figure 4:
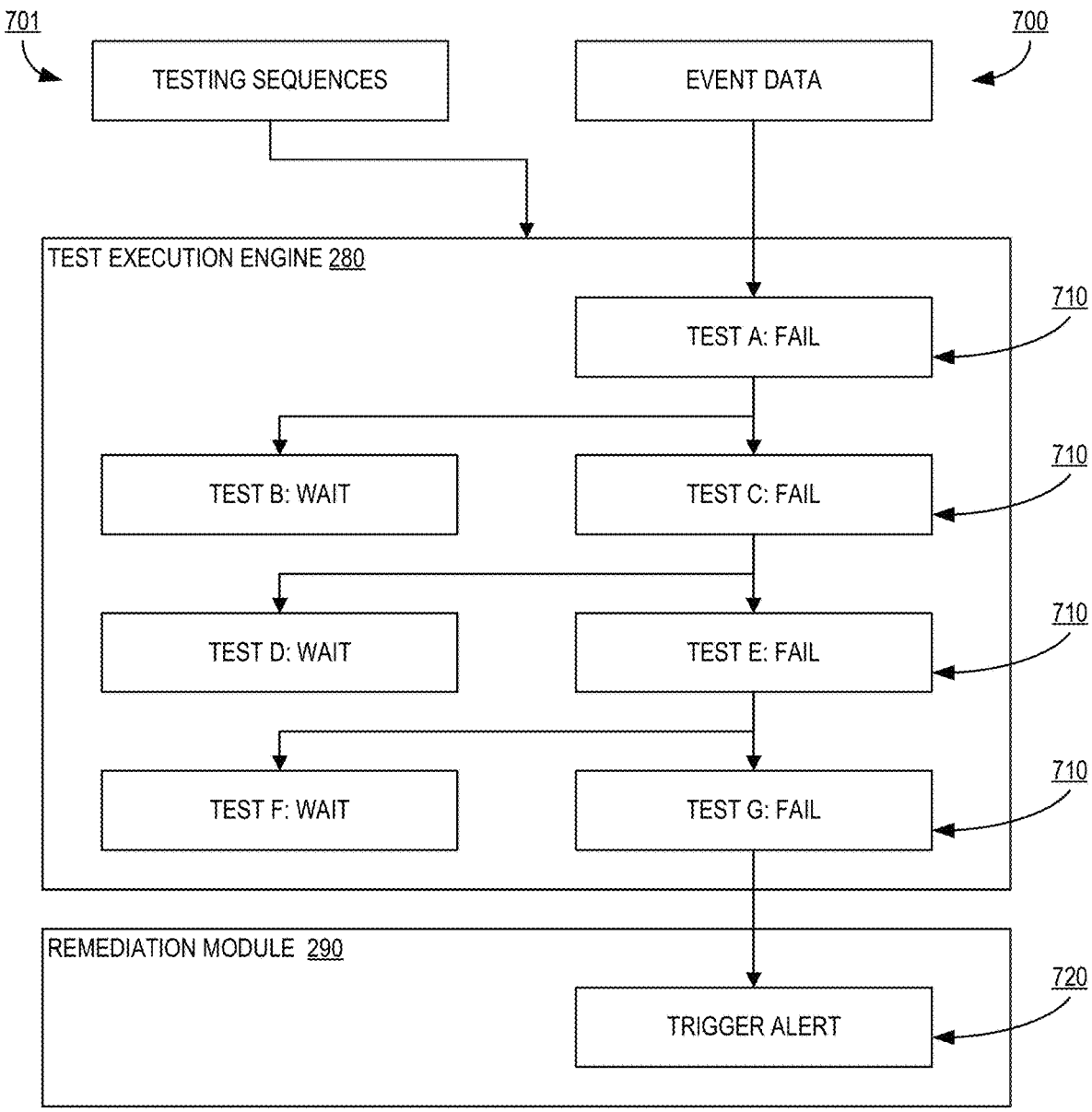

Having thus described embodiments of the invention in general terms, reference will now be made to the accompanying drawings, wherein:

FIG. 1 illustrates an operating environment for the application monitoring system, in accordance with one embodiment of the present disclosure;

FIG. 2 is a block diagram illustrating the application monitoring system;

FIG. 3 is a flow diagram illustrating a process using the application monitoring system, in accordance with one embodiment of the present disclosure;

FIG. 4 is a flow diagram illustrating a test execution engine of the application monitoring system, in accordance with one embodiment of the present disclosure; and

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like which employs information technology resources and particularly technology infrastructure configured for managing one or more computing systems. The computing systems may comprise applications relating to one or more operations of the entity. As such, the entity or managing entity may be any institution, group, association, establishment, authority, or the like, employing information technology resources for managing system-wide applications.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications. "Application" as used herein may refer to any computer or software program which may serve one or more purposes relating to the entity, such as execution of products or services, data analysis and management, information security, internal and/or external communications, and/or any other function performed by the entity. An "event" as used herein may refer to any change in application state as result of an interaction with a user, system, and/or another application (e.g. logging in, changing settings, or the like) and/or as a result of a change in hardware functionality (e.g. loss of Internet connection, outage, or the like). An "unplanned event" may refer to any event which is considered by the managing entity to cause a security or functionality concern, or which is otherwise not considered routine.

"Engine" as used herein may refer to core elements of a computer program, or part of a computer program that serves as a foundation for a larger piece of software and drives the functionality of the software. An engine may be self-contained, but externally controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to teach other with one or more components located between the components that are operatively coupled together. Furthermore, "operatively coupled" may mean that the components are detachable from each other, or that they are permanently coupled together. Furthermore, "operatively coupled" may mean that components may be electronically connected.

Embodiments of the invention relate to a comprehensive application monitoring and unplanned event remediation system, which analyzes event data to generate dynamic testing strategies and then applies said testing strategies in real-time to predict future events. The invention provides a unique testing approach by utilizing past event data to prioritize or triage testing of particular application conditions, allowing for continuous monitoring without creating unnecessary strain on available computing resources. Because a variety of application operating states can result in unplanned events, the present invention provides the functional benefit of adapting testing strategies in real-time as an application's operating state changes, increasing the likelihood of correctly predicting a future event. The present invention also provides a system of alerting a managing entity system to a future event, as well as providing instructions for preventative or remedial actions which may serve to lessen the potential impact of an unplanned event on a managing entity.

FIG. 1 illustrates an operating environment 100 for the application monitoring system, in accordance with one embodiment of the present disclosure. As illustrated, the operating environment 100 includes an application monitoring system 200, a managing entity system 300 comprising one or more applications 301, and one or more remote databases 400 which may be in operative communication with a network 101 as depicted. In some embodiments, the application monitoring system 200, the managing entity system 300, and the one or more remote databases 400 may be used to implement the processes described herein, in accordance with an embodiment of the present invention. In this regard, the application monitoring system 200 and managing entity system 300 may include one or more applications stored thereon that are configured to interact with one another and the one or more remote databases 400 to implement any one or more portions of the process flows described herein.

Typically, the application monitoring system 200 and the one or more remote databases 400 are in operative communication with the managing entity system 300, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the application monitoring system 200 and the managing entity system 300). In this regard, the wireless communication channel may further comprise near field communication (NFC), communication via radio waves, communication through the internet, communication via electromagnetic waves and the like.

The managing entity system 300 may comprise a communication module and memory not illustrated and may be configured to establish operative communication channels with the application monitoring system 200 and/or the one or more remote databases 400 via a network 101. The managing entity system 300 may comprise one or more applications 301 which may provide event data and/or data logs to the managing entity system 300. Said event data may then be accessed by the application monitoring system 200 in order to be analyzed. In some embodiments, some or all of the event data may be stored in the database(s) 400, and the application monitoring system 300 may query the database(s) as needed to access event data. In some embodiments, the application monitoring system 200 may be fully integrated within the managing entity system 300.

As will be discussed in greater detail in FIG. 3, the managing entity system 300 may communicate with the application monitoring system 200 in order to transmit data stored by the managing entity system 300 and/or the remote database(s) 400. In some embodiments, the managing entity may utilize the features and functions of the application monitoring system to receive alerts relating to potential future events, as well as instructions for preventive or remedial actions. Said instructions may allow the managing entity to mitigate or lessen the organizational impact of a future unplanned event, or may allow the managing entity to prevent said event entirely.

FIG. 2 illustrates a block diagram of the application monitoring system 200 associated with the operating environment 100, in accordance with embodiments of the present invention. As illustrated in FIG. 2, the application monitoring system 200 may include a communication device 210, a processing device 220, and a memory device 230 having a test generation module 270, a test execution engine 280, a remediation module 290, a processing system application 250, and a processing system datastore 260 stored therein. As shown, the processing device 220 is operatively connected to and is configured to control and cause the communication device 210 and the memory device 230 to perform one or more functions. In some embodiments, the test generation module 270, the test execution engine 280, the remediation module 290, and/or the processing system application 250 comprise computer readable instructions 240 that when executed by the processing device 220 cause the processing device 220 to perform one or more functions and/or transmit control instructions to the managing entity system 300, the application(s) 301, the remote database(s) 400 and/or the communication device 210. It will be understood that the test generation module 270, the test execution engine 280, the remediation module 290, and/or the processing system application 250 may be executable to initiate, perform, complete, and/or facilitate one or more portions of any embodiments described and/or contemplated herein. The application monitoring system 200 may be owned by, operated by and/or affiliated with the same managing entity that owns or operates the managing entity system 300. In some embodiments, the application monitoring system 200 is fully integrated within the managing entity system 300.

The test generation module 270 may store instructions and/or data that may cause or enable the application monitoring system 200 to receive, store, and/or analyze event data received by the managing entity system 300, the application(s) 301, and/or the remote database(s) 400. The test generation module may process event data and/or metadata to identify test criteria as will be further discussed in FIG. 3. The test execution engine 280 may store instructions and/or data that cause or enable the application monitoring system 200 to determine, in real-time and based on received information, an appropriate test or test set and to apply said test set to event data. The remediation module 290 may store instructions and/or data that cause or enable the application monitoring system to transmit, via the communication device 210, notifications or instructions indicating potential future events as well as preemptive actions.

The communication device 210 may generally include a modem, server, transceiver, and/or other devices for communicating with other devices on the network 101. The communication device 210 may be a communication interface having one or more communication devices configured to communicate with one or more other devices on the network 101, such as the managing entity system 300, the application(s) 301, the remote database(s) 400, and/or other processing systems, data systems, and the like Additionally, referring to the application monitoring system 200 illustrated in FIG. 2, the processing device 220 may generally refer to a device or combination of devices having circuitry used for implementing the communication and/or logic functions of the data obfuscation system 200. For example, the processing device 220 may include a control unit, a digital signal processor device, a microprocessor device, and various analog-to-digital converters, digital-to-analog converters, and other support circuits and/or combinations of the foregoing. Control and signal processing functions of the data obfuscation system 200 may be allocated between these processing devices according to their respective capabilities. The processing device 220 may further include functionality to operate one or more software programs based on computer-executable program code 240 thereof, which may be stored in a memory device 230, such as the processing system application 250 and the test execution engine 280. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 220 may be configured to use the network communication interface of the communication device 210 to transmit and/or receive data and/or commands to and/or from the other devices/systems connected to the network 101.

The memory device 230 within the data obfuscation system 200 may generally refer to a device or combination of devices that store one or more forms of computer-readable media for storing data and/or computer-executable program code/instructions. For example, the memory device 230 may include any computer memory that provides an actual or virtual space to temporarily or permanently store data and/or commands provided to the processing device 220 when it carries out its functions described herein. As used herein, memory may include any computer readable medium configured to store data, code, or other information. The memory device 230 may include volatile memory, such as volatile Random Access Memory (RAM) including a cache area for the temporary storage of data. The memory device 230 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the application monitoring system 200 performing one or more steps described herein in conjunction with other devices and systems, either automatically based on executing computer readable instructions of the memory device 230, or in response to receiving control instructions from the managing entity system 300. In some instances, the system refers to the devices and systems on the operating environment 100 of FIG. 1. The features and functions of various embodiments of the invention are be described below in further detail. It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 is a high-level process flow diagram illustrating a process using the application monitoring system, in accordance with one embodiment of the present disclosure. The process begins at block 600, where the system receives a data transmission from the managing entity system 300 or the application(s) 301, containing a plurality of variables to be utilized by the test generation module 270. The variables may comprise event and/or performance data which may include user information (e.g. number of users logged in, user location, user authorization data, and the like), system data (e.g. available system bandwidth, available system storage, or the like), application location (e.g. cloud, edge server, private server), application priority type (e.g. critical vs. non-critical), timestamps, and/or any other information type which may impact application performance. In some embodiments the system may receive a data transmission after the occurrence of an unplanned event, such as an application outage or security breach, or the managing entity may choose to group datasets together and send an aggregated data transmission after a predetermined amount of time, such as once per day.

The process may then continue to block 610, wherein for each individual data transmission, the system may utilize the test generation module 270 to process the data and/or metadata in order to create a time-dependent dataset of application conditions that occurred both before and during an event. For example, the test generation module 270 may create a dataset containing a value of each variable at one hour, thirty minutes, ten minutes, one minute, and thirty seconds before the occurrence of the event. The times chosen by the test generation module 270 may vary depending on event type, timestamps available from the application 301, or the like.

The process may then continue to block 620, wherein for each variable, the test generation module 270 determines an associated test and test pass/fail criteria. For example, in some embodiments, a variable may be "number of authorized users logged in." The test generation module 270 may determine that in the ten minutes leading up to an unplanned event, over one thousand authorized users were logged in. Therefore, the test generation module may create a test wherein the test is passed when less than one thousand authorized users are logged in, and failed when over one thousand authorized users are logged in. In another example, the test generation module may determine that in the ten minutes leading up to an unplanned event, the number of logins increased by 25% from the last ten minutes. In this example, the test generation module may create a test wherein the test is passed if every ten minutes, the number of logins remains unchanged by less than 25%. If the number of logins increases by more than 25% in a ten-minute period, the test may be failed. In some embodiments, the test generation module 270 may create multiple tests for each variable received by the managing entity system 300. The process may then continue to block 630, wherein the test generation module 270 may then utilize the communication device 210 to store the received data from the managing entity system 300, as well as the determined tests and pass/fail criteria for each variable of the received data, in the database(s) 400.

The process may then continue to block 640, wherein for each type of unplanned event (e.g. unauthorized login, system outage, data corruption, etc.), the test generation module 270 queries the database(s) 640 for each event type and all associated tests. The test generation module then calculates 650, for each event type, a correlation value between each associated test and the occurrence of an unplanned event. For example, the test generation module may determine that a number of authorized users logged in has no correlation to whether an application experiences an outage, but that a volume of data being exported from the application has a high correlation with an outage occurring. In some embodiments, the test generation module may calculate a correlation value at each timestamp of the dataset. For example, the application may determine that the volume of data being exported from the application has the highest correlation with an application outage in the twenty minutes before the outage occurs. Based on these calculations, the process may be continue to block 660, wherein for each event type, the test generation module calculates a preferred testing sequence that has the highest correlation with event occurrence at a predetermined amount of time before event occurrence. For example, the test generation module may calculate a testing sequence with 90% accuracy of event prediction at twenty seconds before event occurrence and another testing sequence with 85% accuracy of event prediction at five minutes before event occurrence. The choice of preferred testing sequence may depend on event type, application priority, system speed, and other factors as determined by the managing entity. The process depicted in FIG. 3 may be iterative, and preferred testing sequences may be updated continuously as new event data is received from the managing entity system 300.

FIG. 4 is a high-level process flow diagram illustrating an exemplary process using the application monitoring system, in accordance with one embodiment of the present disclosure. The process may begin as the test execution engine 280 receives a continuous stream of event and/or performance data 700 from the managing entity system 300 and/or application(s) 301. The test execution engine 280 may also receive a plurality of preferred testing sequences 701 from the test generation module 270, which may be continuously updated as is discussed in further detail in FIG. 3.

The test execution module 280 may then apply each test 710 of each testing sequence 701 to the event data 700. Because each testing sequence 701 is time-dependent, tests may be applied to the data in series (i.e. "Test A" and "Test B" as shown in FIG. 4) and/or in parallel (i.e. "Test B" and "Test C" as shown in FIG. 4). When a variable of the event data meets the failure criteria of a test as specified by the test generation module 270, the test execution engine 280 may apply the subsequent test(s) in the sequence. If a variable of the event data passes a given test, the test execution engine may continue to continuously monitor said variable until failure criteria is met. In the exemplary process shown in FIG. 4, the event data fails an initial "Test A," prompting the system to apply the next two tests in the sequence, "Test B" and "Test C." The event data does not fail "Test B," prompting the system to continuously monitor the variable that is being tested by "Test B." The event data fails "Test C," prompting the system to apply two subsequent tests, "Test D" and "Test E."

This approach may be used to apply multiple testing sequences to the event data at once. For example, tests "B" and "C" may be the initial tests in two testing sequences, one which predicts a system-wide connection loss and one which predicts a local connection loss. By waiting for a failure before applying subsequent tests, the system is able to efficiently manage computational power and arrive at an event prediction before fully completing all available testing sequences.

In some embodiments, when the event data 700 has failed all tests 710 of a particular test sequence 701, the remediation module 290 sends a notification 720 to the managing entity system 300 indicating a potential future application event. In some embodiments, the notification 720 includes instructions which can be executed by the managing entity in order to prevent the event from occurring. Additionally or alternatively, the notification may include instructions which can be executed by the managing entity in order to remediate the effect of the future event. For example, the instructions transmitted by the remediation module 290 may comprise sending a push notification to all users logged in to the application advising that they save any work in progress. In some embodiments, the instructions transmitted by the remediation module 290 may comprise automatically saving any work in progress from any logged in user.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for application monitoring, the system comprising:
at least one non-transitory storage device; and
at least one processing device coupled to the at least one non-transitory storage device, wherein the at least one processing device is configured to:
monitor event data via continuous communication with a managing entity system, wherein the event data comprises a plurality of variables and associated values;
apply a plurality of event type testing sequences to the event data, wherein each event type testing sequence comprises a plurality of tests, wherein each test comprises failure criteria, and wherein applying each testing sequence further comprises:
applying one of the plurality of tests to the event data and
when the event data does not meet the failure criteria, continuing to monitor the event data via continuous communication with the managing entity, or
when the event data meets the failure criteria, applying a different one of the plurality of tests to the event data; and
transmit, when the event data meets the failure criteria for each of the plurality of tests in the event type testing sequence, a notification to the managing entity system.

2. The system of claim 1, wherein the at least one processing device is further configured to:
receive an event data transmission from the managing entity system, wherein the event data transmission comprises an event type, the plurality of variables and associated values, and a plurality of time values;
identify, from the event data transmission, a new event dataset, wherein the new event dataset comprises an event type and a value of each variable for each time value;
query, from a database, one or more past event datasets, wherein the event type of each past dataset matches the event type of the new event dataset;
calculate, for each variable of each event dataset, a likelihood score of each value occurring at each time value; and
calculate, using a combination of likelihood scores, one or more event type testing sequences.

3. The system of claim 2, wherein calculating, using a combination of likelihood scores, one or more event type testing sequences further comprises calculating a plurality of potential event type testing sequences.

4. The system of claim 3, wherein the at least one processing device is further configured to, after calculating a plurality of potential event type testing sequences, determine one or more preferred event type testing sequences from the plurality of potential event type testing sequences, based on one or more decision factors.

5. The system of claim 4, wherein applying a plurality of event type testing sequences to the event data further comprises applying each of the one or more preferred event type testing sequences to the event data.

6. The system of claim 1, wherein the at least one processing device is further configured to, after calculating the one or more event type testing sequences, store the new event dataset in the database.

7. The system of claim 1, wherein the notification to the managing entity system comprises an indication of a potential future event and instructions for a preventative action which can be executed by the managing entity system.

8. A computer-implemented method for application monitoring, the method comprising:
providing a computing system comprising a computer processing device and a non-transitory computer readable medium, wherein the computer readable medium comprises configured computer program instruction code, such that when said instruction code is operated by said computer processing device, said computer processing device performs the following operations:
monitor event data via continuous communication with a managing entity system, wherein the event data comprises a plurality of variables and associated values;
apply a plurality of event type testing sequences to the event data, wherein each event type testing sequence comprises a plurality of tests, wherein each test comprises failure criteria, and wherein applying each testing sequence further comprises:
applying one of the plurality of tests to the event data and
when the event data does not meet the failure criteria, continuing to monitor the event data via continuous communication with the managing entity, or
when the event data meets the failure criteria, applying a different one of the plurality of tests to the event data; and
transmit, when the event data meets the failure criteria for each of the plurality of tests in the event type testing sequence, a notification to the managing entity system.

9. The method of claim 8, further comprising the following operations:
receive an event data transmission from the managing entity system, wherein the event data transmission comprises an event type, the plurality of variables and associated values, and a plurality of time values;
identify, from the event data transmission, a new event dataset, wherein the new event dataset comprises an event type and a value of each variable for each time value;
query, from a database, one or more past event datasets, wherein the event type of each past dataset matches the event type of the new event dataset;
calculate, for each variable of each event dataset, a likelihood score of each value occurring at each time value; and
calculate, using a combination of likelihood scores, one or more event type testing sequences.

10. The method of claim 9, wherein calculating, using a combination of likelihood scores, one or more event type testing sequences further comprises calculating a plurality of potential event type testing sequences and determining one or more preferred event type testing sequences from the plurality of potential event type testing sequences, based on one or more decision factors.

11. The method of claim 10, wherein applying a plurality of event type testing sequences to the event data further comprises applying each of the one or more preferred event type testing sequences to the event data.

12. The method of claim 8, further comprising the following operation: after calculating the one or more event type testing sequences, store the new event dataset in the database.

13. The method of claim 8, wherein the notification to the managing entity system comprises an indication of a potential future event and instructions for a preventative action which can be executed by the managing entity system.

\* \* \* \* \*